United States Patent [19]
Dahlquist

[11] 3,817,356

[45] June 18, 1974

[54] VIBRATION DAMPING

[75] Inventor: Carl A. Dahlquist, Roseville, Minn.

[73] Assignee: Minnesota Mining and Manufacturing Company, St. Paul, Minn.

[22] Filed: May 29, 1973

[21] Appl. No.: 364,734

[52] U.S. Cl. .................................. 188/1 B, 52/173
[51] Int. Cl. ............................................. F16f 7/08
[58] Field of Search ................ 52/173; 161/46, 168; 188/1 B; 252/62.51

[56] References Cited
UNITED STATES PATENTS

| | | | |
|---|---|---|---|
| 3,101,744 | 8/1963 | Warnaka | 188/1 B UX |
| 3,327,812 | 6/1967 | Lazan | 188/1 B |
| 3,605,953 | 9/1971 | Caldwell et al. | 188/1 B |

Primary Examiner—Duane A. Reger
Attorney, Agent, or Firm—Alexander, Sell, Steldt & DeLaHunt

[57] ABSTRACT

A method of damping vibrations in a steel panel which is subject to destructive or annoying vibrations. A vibration damping sandwich comprising a sheet of a flexible magnetic material and a flexible ferromagnetic sheet coextensive with one face of the flexible magnetic sheet is placed with the exposed face of the magnetic sheet against the steel panel to cover at least one-tenth of the surface area of the panel. The damping sandwich has sufficient flexibility and magnetic strength to conform to the steel panel and to maintain intimate contact therewith to damp vibrations in the panel through frictional sliding between the panel and the layers of the damping sandwich and within the damping sandwich.

4 Claims, 5 Drawing Figures

PATENTED JUN 18 1974  3,817,356

VIBRATION DAMPING

FIELD OF THE INVENTION

The present invention relates to vibration damping of a structure that is subject to annoying and/or destructive vibrations.

BACKGROUND OF THE INVENTION

Resonant vibration control is an important consideration when designing structures to function in a dynamic environment. The high vibration and noise levels associated with modern high energy power sources exist over a broad frequency range. The transmission of power source vibration by resonantly vibrating structural members creates large dynamic stresses in the structure, with high accelerations transmitted to critical components. Uncontrolled resonant vibrations result in excessive noise, structural fatigue, and component failure.

The conventional approaches that are used to avoid detrimental resonant conditions include rigidization of structural members, decoupling of resonating systems, detuning of coupled resonators, using high fatigue strength structural materials, reducing the vibration excitation of the structure and incorporating high energy dissipating materials into the structural fabrication. All of these methods save the last are unacceptable in many applications because they add too much weight and/or they do not control a broad frequency band of structural vibrations. Thus, recent attention has focused on structural fabrications that possess damping mechanisms capable of dissipating large amounts of energy. The principal example of such structural fabrications is a structure incorporating a viscoelastic material which dissipates the energy internally. Such structures are disclosed in U.S. Pat. Nos. 2,138,176; 2,272,639; 3,211,491; and 3,605,953.

Viscoelastic shear damping does, however, have one serious drawback. The damping properties of viscoelastic materials change quite radically with temperature and, therefore, such systems are only optimumly efficient when they are utilized in temperature controlled environments within specified frequency ranges.

SUMMARY OF THE INVENTION

The present invention provides a method of damping vibrations in a steel panel which is subject to annoying and/or destructive vibrations and which has a thickness X and an area Y. When used herein "steel panel" means any wall structure having at least a 0.0005 inch thick ferromagnetic surface layer, whether the wall structure has such a surface layer in its original state or such a surface layer is affixed to a nonferromagnetic base just prior to practicing the method of the present invention.

The method comprises providing a vibration damping sandwich comprising a sheet of a flexible magnetic material having a major portion of permanent magnet particles in an organic binder, the flexible magnetic material having a co-efficient of friction with steel of at least 0.3, a $BH_{max}$ of at least $0.5 \times 10^6$ gauss-oersteds and a thickness of 0.01 inch to 0.5 inch, and a flexible ferromagnetic sheet coextensive with one face of the flexible magnetic sheet and having a thickness 4 percent to 40 percent that of the magnetic sheet but not greater than 0.6X, the vibration damping sandwich having sufficient flexibility to conform to the steel panel and to maintain intimate contact therewith, and placing at least one piece of the vibration damping sandwich with the exposed face of the magnetic sheet against the steel panel to cover at least 0.1Y to damp vibrations in the steel panel.

Vibrations in the steel panel are damped effectively over wide ranges of environmental temperatures and frequencies, the vibrational energy being dissipated as heat produced by sliding friction between the steel panel and the damping sandwich and within the damping sandwich.

DESCRIPTION OF THE PREFERRED EMBODIMENTS

Figure 1:
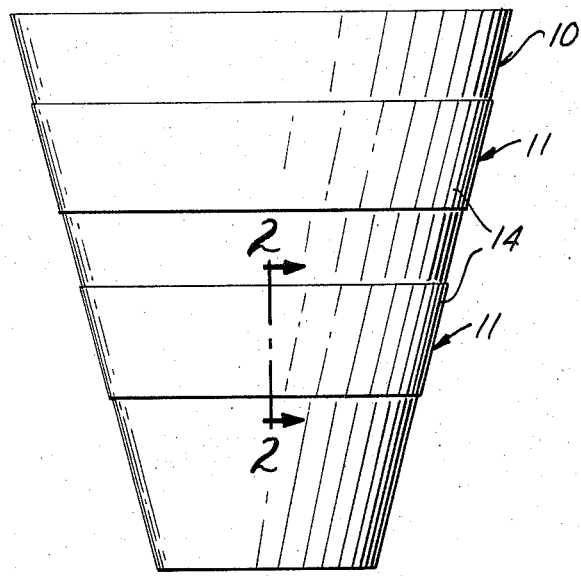
FIG. 1 is an elevation view of a hopper to which a vibration sandwich has been applied in accordance with the method of the present invention.
Figure 2:
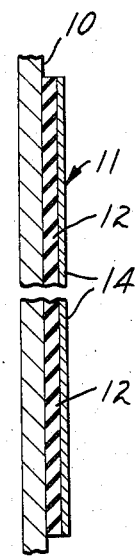
FIG. 2 is a cross-sectional view taken along line 2—2 of FIG. 1.

FIGS. 1 and 2 illustrate a hopper 10 vibration-damped in accordance with the method of the present invention. The truncated conical hopper 10 is illustrative of the types of structures on which the method of the present invention may provide effective vibration damping. The hopper 10 may be 10 feet or more in height and serve as a receptacle for hard particulate material which when dumped into the hopper produce vibrations in the wall of the hopper that are annoying and sometimes harmful to the human ear.

It is first necessary to determine the extent to which it is desired to damp vibrations in the hopper wall. It is normally impractical from an economical standpoint to attempt to even substantially eliminate vibration in such a structure. A limit of vibration tolerance must, therefore, be realistically set. Vibrations in the hopper wall will then be effectively damped when the vibration level is reduced to the tolerance level set.

The wall of the hopper 10 constitutes a steel panel having a thickness X and an external surface area Y. If the hopper wall is interrupted either internally or externally by reinforcing struts each section of the hopper wall between adjacent struts will have its own characteristic vibration and each section, therefore, may be considered to be a steel panel within the present invention.

In light of the vibration pattern in the hopper wall and the thickness and surface area thereof, a vibration damping sandwich 11 is next constructed. The vibration damping sandwich 11 comprises a sheet of a flexible magnetic material 12 having a major portion of permanent magnet particles in an organic binder. The flexible magnetic material has a coefficient of friction with steel of at least 0.3, a $BH_{max}$ of at least $0.5 \times 10^6$ gauss-oersteds and a thickness of 0.01 inch to 0.5 inch. The damping sandwich is completed by a flexible ferromagnetic sheet 14 coextensive with one face of the flexible magnetic sheet 12 and having a thickness 4 percent to 40 percent that of the magnetic sheet but not greater than 0.6X (i.e., six-tenths the thickness of the hopper wall). The vibration damping sandwich 11 is constructed to have sufficient flexibility to conform to the steel panel and to maintain intimate contact therewith. At least one piece of the vibration damping sandwich 11 is placed with the exposed face of the magnetic sheet 12 against the steel panel to cover at least 0.1 Y (i.e., one-tenth the surface area of the steel panel) to damp vibrations in the steel panel. In the embodiment illustrated in FIG. 1 two strips of the damping sandwich 11 have been applied around the circumference of the hopper 10 to damp the vibrations therein.

Figure 3:
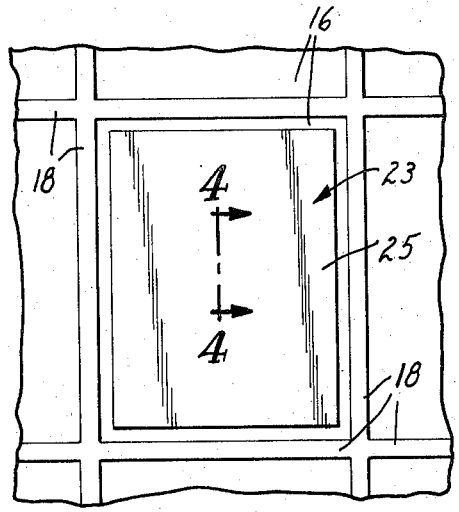
FIG. 3 is a partial elevation view of the wall structure of an aircraft to which a vibration damping sandwich has been applied in accordance with the method of the present invention.
Figure 4:
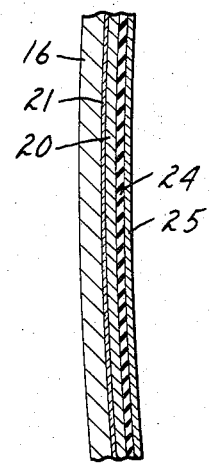
FIG. 4 is a cross-sectional view taken along line 4—4 of FIG. 3.

FIGS. 3 and 4 illustrate a vibration damped section 16 of an aluminum airplane wall. The damped section is surrounded by support struts 18 and, therefore, it is considered alone as the panel to be damped. Since the wall section 16 is made of aluminum a ferromagnetic metal sheet 20 is first secured to the panel by an adhesive layer 21 to provide a steel panel. A vibration damping sandwich 23 comprising a sheet of a flexible magnetic material 24 and a coextensive flexible ferromagnetic sheet 25 like that utilized in the first embodiment is then constructed. Finally, the vibration damping sandwich 23 is placed against the bonded ferromagnetic sheet 20 to damp vibrations in the airplane panel 16.

The exact structure and size of vibration damping sandwich 11 or 23 to be used in the illustrated embodiments to reduce the vibration level to the desired tolerance level depends of course upon the vibration damping efficiency of the damping sandwich.

Vibrations in a steel panel are damped by a damping sandwich applied in accordance with the present invention through frictional sliding between the steel panel and the damping sandwich and between layers of the damping sandwich which dissipates the vibration energy as heat. The damping efficiency is dependent upon the magnetic holding power of the damping sandwich to the steel panel and the coefficient of friction between the flexible magnetic material and the material it slides against. It has been found that with the flexible magnetic sheet materials now in general use which have multiple parallel poles per inch along their faces, a flexible magnetic material having a holding power, $BH_{max}$, of at least $0.5 \times 10^6$ gauss-oersteds and a coefficient of friction with steel of at least 0.3 may be utilized with a 0.0005 inch thick sheet steel overlay to produce an effective vibration damping sandwich. The sheet steel overlay increases the holding power of the damping sandwich over that of the flexible magnetic material alone by providing a low reluctance path for at least a portion of the magnetic lines of flux between poles on the faces of the magnetic material.

Increasing either the coefficient of friction of the flexible magnetic material with steel or its magnetic holding power without changing its other properties will increase its damping efficiency and both are, therefore, desirable. An increase in the thickness of the sheet steel overlay is also desirable to the point where all of the lines of flux between adjacent poles on the face of the magnetic material pass through the sheet steel. Beyond such thickness the sheet steel may be increased to increase the mass of the steel panel and damping sandwich to change the vibration pattern but without increasing the damping efficiency. In view of these considerations flexible ferromagnetic sheets having a thickness 4 percent to 40 percent that of the flexible magnetic sheet used have practical utility.

The sheet of flexible magnetic material is from 0.01 inch to 0.5 inch thick, the lower limit representing a practical manufacturing and handling capability and the upper limit representing a thickness having utility and economy in heavy duty applications, multiple layers of damping sandwiches being preferred for damping efficiency. It is important that the flexible magnetic materials be in true sheet form, that is that it have flat surfaces so that it will lay flat against a steel panel and make good surface contact with the flexible ferromagnetic sheet overlayer so that the damping sandwich will exhibit its maximum holding power. It has been found necessary in some cases to surface grind commerically available flexible magnetic materials to make their surfaces acceptably flat.

The thickness of the flexible ferromagnetic sheet should not be greater than six-tenths the thickness of the steel panel to which the vibration damping sandwich is applied. This represents a stiffness ratio of the flexible ferromagnetic sheet to a steel sheet of 1 to 5 which will assure that the overlying ferromagnetic sheet will follow the vibration of the underlying steel panel. Furthermore, to assure that the vibration damping sandwich will follow one degree of curvature in a vibrating steel panel the vibration damping sandwich must have sufficient flexibility to conform to the steel panel and to maintain intimate contact therewith over the entire surface area of contact. For only if the vibration damping sandwich intimately contacts the steel panel and conforms thereto during vibration will efficient vibration damping be obtained.

Finally, at least one-tenth of the surface area of the steel panel to be damped is covered with the vibration damping sandwich. At least this much coverage has been found necessary before the damping effect is significantly noticeable. In the illustrated embodiments a larger portion of the surface area is covered with a relatively thin damping sandwich to damp the entire surface. If severe vibrations are experienced it is preferred to use thicker damping sandwiches and/or multiple layer damping sandwiches. And, in applications where the major vibration displacements (the antinodes) are severe and localized and the vibration frequencies that excite vibration in the panel are generally constant the method of the present invention preferably comprises covering a smaller area including the antinodes with a plurality of layers of damping sandwiches.

The method of the present invention preferably includes, as a further step, rigidly securing the vibration damping sandwich to the steel panel at one point or along a line to maximize the average displacement between the sandwich and the steel panel and between the layers of the sandwich. The sandwich may, for example, be secured by one or more mechanical fasteners or by adhesive bonding along a line. Securing of the damping sandwich to the steel panel in this manner assures the maximum energy dissipation (i.e., the maximum damping efficiency).

Figure 5:
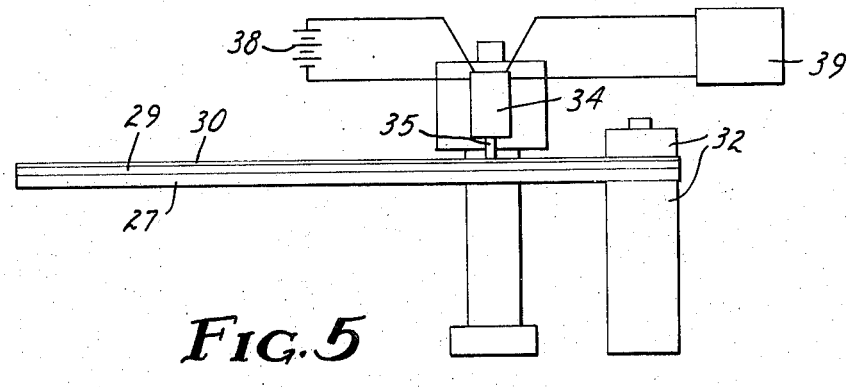
FIG. 5 is a longitudinal elevation view of a test apparatus used to determine the efficiency of vibration damping materials.

The damping efficiency of various damping sandwiches and many of the critical limitations recited for the damping sandwich of the present invention and its constituent parts were determined utilizing the test apparatus illustrated in FIG. 5. In the test apparatus the steel panel is a steel test bar 27 of uniform width and thickness. The vibration damping sandwich comprises a strip of a flexible magnetic material 29 and a coextensive strip of sheet steel 30 placed on and substantially covering one face of the steel bar. One end of the test bar-damping sandwich composite is held in a clamp 32 and a linear variable differential transformer (LVDT) 34 is supported over the composite and spaced from the clamp 32 with its core 35 contacting the upper surface of the composite. A direct current source 38 provides power to the LVDT 34 and a chart recorder 39 records movement of the LVDT core 35 and thereby vibration of the steel test bar 27.

In the tests flexible magnetic materials comprising barium ferrite particles in a nitrile rubber binder, having eight magnetic poles per inch across their width and available under the trade name Plastiform from the Minnesota Mining and Manufacturing Co. with offices at St. Paul, Minnesota were utilized. One inch of the test bar-damping sandwich composite was held in the clamp 32 and the core 35 of the LVDT 34 contacted the composite one inch from the clamp. Vibration traces were produced on the chart recorder 39 by displacing the free end of the test bar 27 from its rest position and releasing it. From a vibration trace the damping factor, N, is calculated by the formula $N = \ln(A_n/A_{n+1})/\pi$ where $A_n$ and $A_{n+1}$ are the amplitudes of successive half cycles on the same side of the neutral axis. The damping factor is thus related to the energy dissipated per vibration cycle and, therefore, it is a figure of merit for damping materials. Damping factors for frictional damping are, however, amplitude dependent, increasing with decreasing amplitude. For this reason all of the calculations of damping factors were made choosing $A_n$ as either 1.0 or 0.5 units on the chart recorder corresponding to displacements of the test bar at the LVDT core of 0.0013 inch and 0.00065 inch, respectively.

Using a steel test bar of dimensions 0.125 inch thick, 0.375 inch wide and 14.5 inches long, a flexible magnetic strip of like width and length and 0.0625 inch thick, and a coextensive sheet steel overlay 0.016 inch thick damping traces were obtained over the temperature range of −78°C. to 84°C. The test frequency was about 25 $H_z$ and the following damping factors were calculated choosing $A_n = 0.5$:

| Temperature °C. | Damping Factor |
|---|---|
| −78 | 0.109 |
| −70 | 0.110 |
| −50 | 0.097 |
| −32 | 0.131 |
| 22 | 0.138 |
| 43 | 0.122 |
| 84 | 0.125 |

In contrast, replacement of the flexible magnetic strip with a 0.125 inch thick layer of a commerically available viscoelastic damping polymer comprising a copolymer of isooctylacrylate and available from Minnesota Mining and Manufacturing Co. as ISPD 113 while retaining the 0.016 inch thick sheet steel overlay gave the following results:

| Temperature °C. | Damping Factor |
|---|---|
| −65 | 0.11 |
| −48 | 0.20 |
| −30 | 0.10 |
| 23 | 0.05 |
| 50 | 0.02 |

The results demonstrate that the damping sandwich applied in accordance with the present invention has a high and substantially constant damping factor over a wide temperature range.

The effect of varying the thickness of the sheet steel overlay was tested using the same test bar and a 0.060 inch thick flexible magnetic material, the unclamped portion of the composite being reduced to 10.75 inches. The following results were obtained:

| Thickness of Overlay (inch) | Damping Factor |
|---|---|
| 0 | 0.046 |
| 0.001 | 0.060 |
| 0.002 | 0.080 |
| 0.005 | 0.090 |
| 0.010 | 0.130 |
| 0.015 | 0.023 |
| 0.020 | 0.23 |
| 0.025 | 0.23 |

The results demonstrate that the overlay contributes to damping but only to a certain thickness (in the test structure somewhere between 0.010 and 0.015 inch) due to the fact that the overlay becomes magnetically saturated at that thickness. The thickness of the overlay that is just saturated is, therefore, preferred. Replacement of the 0.060 inch thick flexible magnetic material with a 0.019 inch thick magnetic material confirmed these findings.

It may be desirable for purposes of shipping and storage of damping sandwiches to adhesively bond the flexible sheet steel overlayer to the sheet of flexible magnetic material to maintain them in alignment. For this reason tests were conducted utilizing various types of adhesive bonds and varying the location of the bond, O-F designating a bond between the overlayer and the flexible magnetic material and F-P indicating a bond between the flexible magnetic material and the steel test bar. In the tests the test bar was 0.125 inch thick, 0.375 inch wide and 14.5 inches long, the flexible magnetic material had the same dimensions and the coextensive sheet steel over-layer was 0.016 inch thick. The results were as follows:

| Type of Adhesive Bond | Location of Bond | N when $(A_n+A_{n+1})/2=$ 0.5 | 1.0 |
|---|---|---|---|
| None | — | 0.59 | 0.39 |
| Pressure-Sensitive Adhesive (PSA)Tape | O—F | 0.32 | 0.35 |
| Contact Bond | O—F | 0.48 | 0.34 |
| Epoxy Bond | O—F | 0.35 | 0.40 |
| PSA Tape | F—P | 0.25 | 0.27 |
| Contact Bond | F—P | 0.55 | 0.31 |
| Epoxy Bond | F—P | 0.24 | 0.27 |
| Contact Bond | O—F & F—P | 0.10 | 0.10 |
| Epoxy Bond | O—F & F—P | 0.03 | 0.03 |

These test results demonstrate that the flexible magnetic material may be adhesively bonded to the steel panel or to the flexible sheet steel overlay without substantially affecting the damping efficiency so long as it is not adhesively bonded to both. Bonding of both surfaces eliminates sliding friction, the mechanism by which the present invention damps vibrations, thereby defeating the present invention.

In further tests steel test bars having vibration damping sandwiches applied in accordance with the present invention are vibrated at resonant frequencies from 5 to 1,000 Hz. These tests demonstrated that the damping factor of a damping sandwich applied in accordance with the present invention will remain substantially constant over a wide range of resonant frequencies.

I claim:

1. A method of damping vibrations in a steel panel which is subject to destructive or annoying vibrations and which has a thickness X and an area Y, comprising the steps of:

providing a vibration damping sandwich comprising a sheet of a flexible magnetic material having a major proportion of permanent magnet particles in an organic binder, said flexible magnetic material having a coefficient of friction with steel of at least 0.3, a $BH_{max}$ of at least $0.5 \times 10^6$ gauss-oersteds and a thickness of 0.01 inch to 0.5 inch, and a flexible ferromagnetic sheet coextensive with one face of said flexible magnetic sheet and having a thickness 4 percent to 40 percent that of the magnetic sheet but not greater than 0.6X, said vibration damping sandwich having sufficient flexibility to conform to the steel panel and to maintain intimate contact therewith, and placing at least one piece of said vibration damping sandwich with the exposed face of said magnetic sheet against the steel panel to cover at least 0.1 Y to damp vibrations in the steel panel.

2. The method of claim 1 including the step of rigidly securing said vibration damping sandwich to said steel panel at least at one point to maximize the average displacement between the sandwich and the steel panel and between the layers of the sandwich.

3. The method of claim 1 including the steps of providing a second vibration damping sandwich as defined in claim 1 and placing at least one piece of said second vibration damping sandwich with the exposed face of its magnetic sheet against and within the periphery of the flexible ferromagnetic sheet of said first vibration damping sandwich.

4. The method of claim 1 wherein said step of placing at least one piece of said vibration damping sandwich comprises placing at least one piece of said vibration damping sandwich against the steel panel to cover a plurality of antinodes.

* * * * *